United States Patent [19]

Saeki

[11] Patent Number: 5,752,739
[45] Date of Patent: May 19, 1998

[54] MOUNTING FOR AN ARMREST IN SEAT

[75] Inventor: Hiroyuki Saeki, Akishima, Japan

[73] Assignee: Tachi-S Co., Ltd., Tokyo, Japan

[21] Appl. No.: 722,987

[22] Filed: Sep. 30, 1996

[51] Int. Cl.[6] .................................................. A47C 13/00
[52] U.S. Cl. ...................................... 297/113; 297/411.32
[58] Field of Search ............................... 297/113, 112, 297/117, 115, 238, 411.2, 411.32, 411.3, 411.38

[56] References Cited

U.S. PATENT DOCUMENTS

| | | | |
|---|---|---|---|
| 2,824,599 | 2/1958 | Quinlan | 297/113 X |
| 3,439,889 | 4/1969 | Karlsen | 297/411.38 X |
| 4,141,586 | 2/1979 | Goldner et al. | 297/117 X |
| 4,205,879 | 6/1980 | Heling | 297/411.32 |
| 4,400,033 | 8/1983 | Pietsch | 297/115 X |
| 4,435,011 | 3/1984 | Hakamata | 297/113 |
| 4,558,901 | 12/1985 | Yokoyama | 297/411.38 X |
| 4,560,203 | 12/1985 | Huber | 297/411.32 X |
| 4,662,674 | 5/1987 | Shira et al. | 297/411.32 X |
| 4,848,840 | 7/1989 | Toya | 297/411.32 |
| 5,292,171 | 3/1994 | Harrell | 297/113 |
| 5,320,414 | 6/1994 | Spykerman et al. | 297/411.32 |
| 5,352,012 | 10/1994 | Chowdhury et al. | 297/113 |
| 5,516,191 | 5/1996 | McKee | |

FOREIGN PATENT DOCUMENTS

| | | |
|---|---|---|
| 7-40261 U | 1/1996 | Japan. |
| 8-24078 | 1/1996 | Japan. |
| 8-228886 | 9/1996 | Japan. |

Primary Examiner—Milton Nelson, Jr.
Attorney, Agent, or Firm—Browdy and Neimark

[57] ABSTRACT

An arrangement for mounting an armrest in a seat, in which the armrest has a rotary shaft and a stopper rod, both of which projects outwardly of the armrest, and a first support bracket has been pre-assembled in a seat back of the seat, while a second support bracket is provided separately from the seat back. The first support bracket has an arcuate guide hole and a widened region defined in the arcuate guide hole. The stopper rod is provided with a stopper element which is smaller than such widened region. With this arrangement, the armrest can be first retained to the first support bracket by inserting both stopper rod and stopper element through the arcuate guide hole via the widened region. Then, the second support bracket can be attached together with the armrest to the seat back, without the need for holding the armrest on the worker's part, hence permitting for easy mounting of the armrest in the seat back.

8 Claims, 2 Drawing Sheets

5,752,739

1

MOUNTING FOR AN ARMREST IN SEAT

BACKGROUND OF INVENTION

1. Field of the Invention

The present invention relates to an armrest movably mounted in a seat back of a rear seat in an automobile, and is in particular directed to an arrangement for mounting such movable armrest in the seat back of automotive rear seat.

2. Background of Prior Art

Rotatably mounted armrests in the center of a seat back of an automotive rear seat are known. A seat cushion of the rear seat from such an armrest can be rotated into a horizontal use position into a storage recessed portion of the seat back, i.e., at an upright non-use position. This armrest has a rotary shaft and a stopper rod, and is constructed such that the rotary shaft passed through two bearing holes formed respectively in a pair of spaced-apart brackets fixed in the seat back. The stopper rod is slidably inserted through two arcuate holes formed respectively in the same pair of brackets, wherein each arcuate hole extends along a circle having a center of rotation at each bearing hole. Thus, the armrest may be rotated downwardly about the rotary shaft from the upright non-use position to the horizontal use position and retained there due to the stopper rod contacted with the uppermost ends of arcuate holes. On the other hand, the armrest may be rotated upwardly about the bearing holes from the use position to the non-use position and retained there due to the stopper rod contacted with the lowermost ends of arcuate holes.

However, in this conventional armrest arrangement, before mounting the armrest itself to the seat back, it is necessary for a worker to fasten both brackets to a frame within the seat back, while holding the armrest body between the two brackets, with the result that the armrest is unstably mounted.

SUMMARY OF THE INVENTION

In view of the above-stated drawbacks, it is therefore a primary purpose of the present invention to provide an improved mounting for a movable armrest in a seat or seat back of the seat, which permits for easy mounting of the armrest therein.

In order to achieve such purpose, the mounting in accordance with the present invention comprises:

- a rotary shaft provided in an armrest, which has a first end portion projecting from one side of the armrest and a second end portion projecting from another side of the armrest;
- a stopper rod provided in the armrest, which has a first end portion projecting from a first side of armrest and a second end portion projecting from a second side of armrest;
- a first support bracket means pre-assembled integrally in the seat back, the first support bracket means including a hole and an arcuate guide hole formed therein;
- the arcuate guide hole of first support bracket means having a widened region defined therein.
- the stopper means fastened on the first end portion of the stopper rod, the stopper means being small relative to the widened region in the arcuate guide hole;
- wherein the first end portion of the rotary shaft is inserted rotatably through the hole of first support bracket, while both first end portion and stopper means of the stopper rod is inserted, via the widened region, through

2 the arcuate hole of first support bracket means such as to be slidably fitted therein against removal from the first support bracket means;

- a second support bracket means provided separate from the seat back, the second support bracket means including a hole and an arcuate guide hole formed therein; and
- a connecting means for firmly connecting the second support bracket means with the seat back.

Accordingly, in assemblage, the second end portions of rotary shaft and stopper rod may be rotatably inserted through the hole and arcuate guide hole of second support bracket means, respectively, while the first end portions of rotary shaft and stopper rod are retained to the first bracket means by the stopper means, and then, the second support bracket means may be firmly connected with the seat back via the connecting means. Hence, only one second bracket means needs to be fixed to the seat back and there is no need for a worker to hold the armrest, thereby permitting the armrest to be easily mounted in the seat back.

Preferably, the stopper means may comprise a circular or disc-like stopper element fixed on the first end portion of stopper rod, the circular stopper element having an outer diameter which is small relative to the widened region of arcuate guide hole formed in the first support bracket means and large relative to a width of the arcuate guide hole associated with the first support bracket means.

Preferably, the widened region may be defined in a circular fashion in the arcuate guide hole, such as to have an inner diameter greater than the outer diameter of the circular stopper element.

Preferably, the widened region may be formed midway in the arcuate guide hole associated with said first support bracket means.

Other features and advantages of the present invention will become apparent from reading of the descriptions hereinafter, with reference to the annexed drawings.

DETAILED DESCRIPTION OF PREFERRED EMBODIMENT OF THE INVENTION

Figure 1:
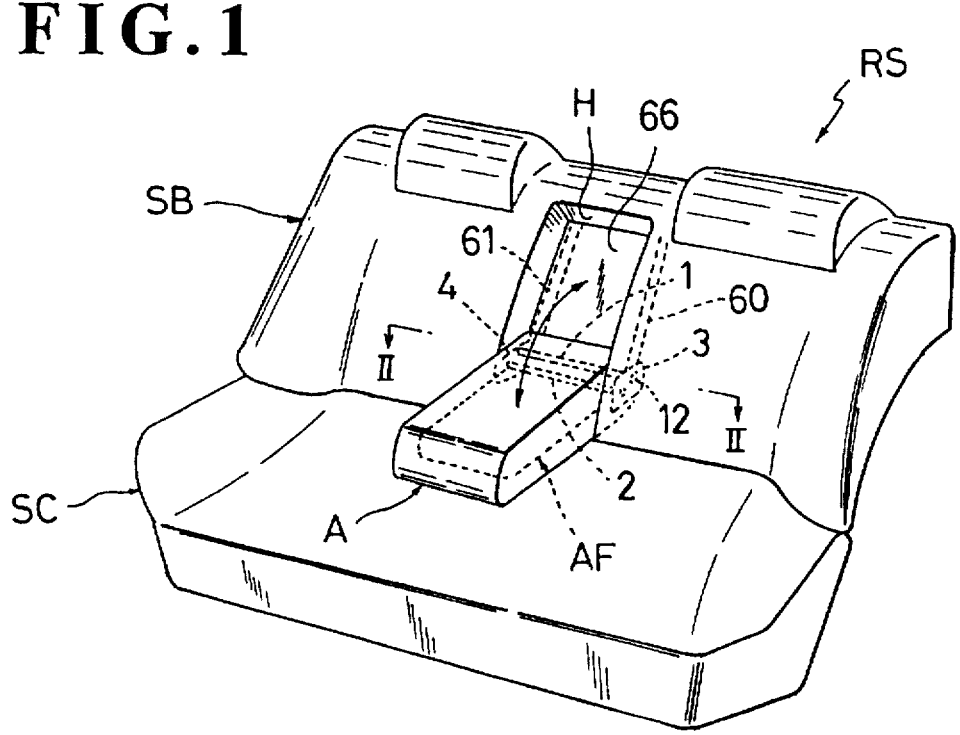
FIG. 1 is a schematic perspective view of a rear seat for use in an automobile, in which an armrest is mounted in accordance with the present invention.

Referring to FIGS. 1 to 4, there is illustrated a mounting for a movable armrest in a seat back (SB) or a rear seat (RS) for use in an automobile, in accordance with the present invention. The armrest used is shown in FIG. 1 to be of a movable or vertically rotatable type, as designated by (A), which may be rotated about a rotary shaft (2) downwardly toward a generally horizontal use position where the armrest (A) rests on a seat cushion (SC) and also rotated about the rotary shaft (2) upwardly toward a generally upright non-use position where the armrest (A) is stored in a storage recessed area (H) formed in the center of seat back (SB).

Figure 2:
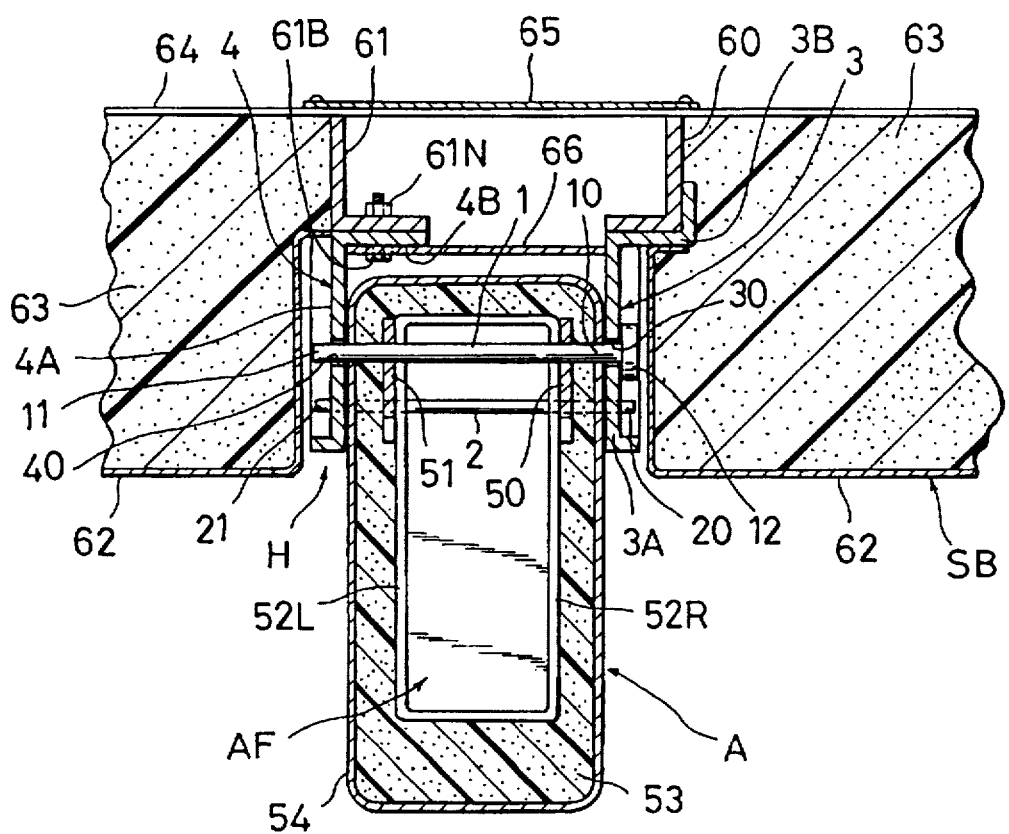
FIG. 2 is a fragmentary sectional view taken along the line II—II in FIG. 2.
Figure 3:
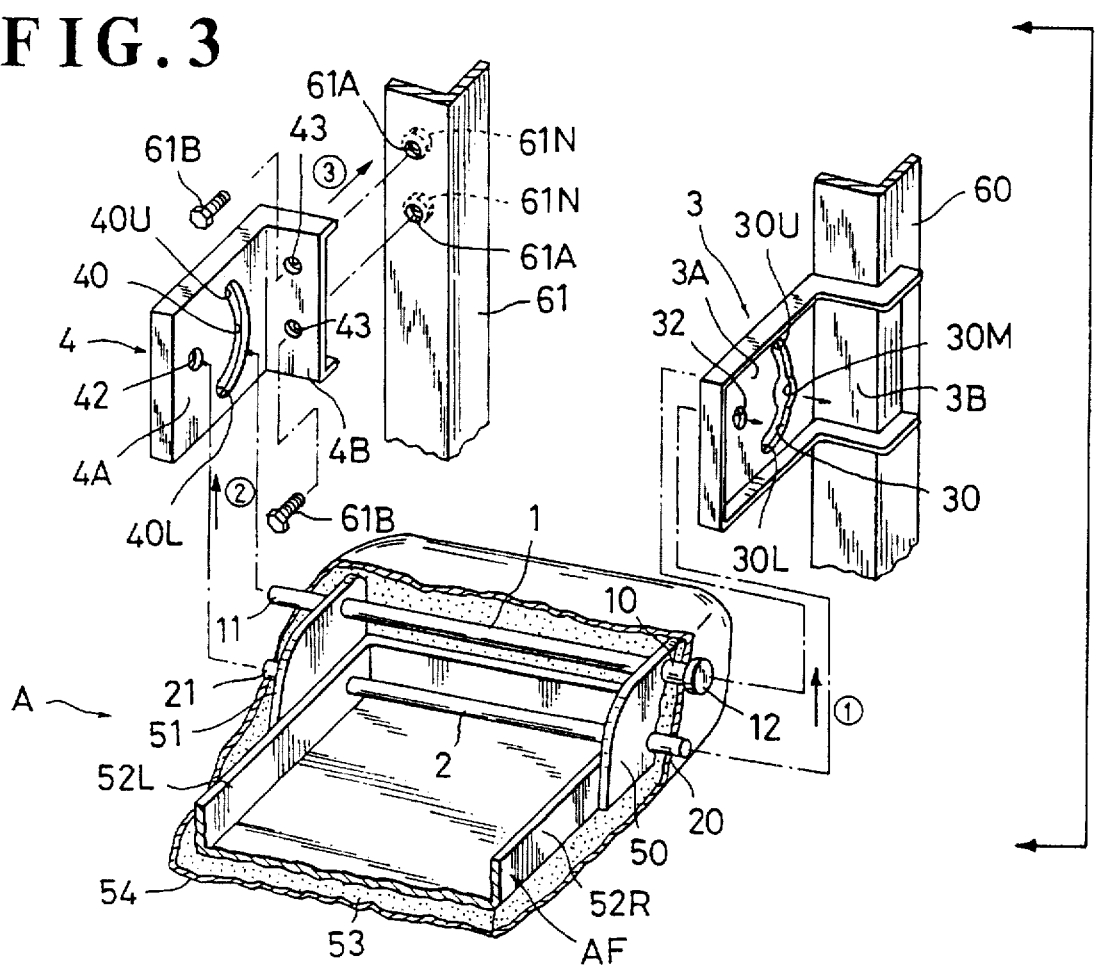
FIG. 3 is a partly broken, exploded schematic perspective view showing principal parts of the mounting for the armrest in the seat back of rear seat in accordance with the present invention.

The armrest (A) is basically comprised of a tray-like armrest frame (AF), a pair of first and second base brackets (50)(51), a rotary shaft (2) and a stopper-rod (1). The armrest (A) further includes an upholstery covering those basic constituent elements, which is composed of a foam padding (53) and a top covering member (54). Most of such armrest structure is known in the art. Specifically, as shown in FIGS. 2 and 3, the armrest frame (AF) has two upwardly projected first and second side sections (52R)(52L). Fixed respectively to the rearward end portions of those two side sections (52R)(52L) are the two base brackets (50)(51) which project outwardly from the frame (AF). The armrest frame (AF) may be formed from a metallic or hard synthetic resin material into the illustrated shape or a box-like shape.

The rotary shaft (2) and stopper rod (1) extend through both base brackets (50)(51) in a direction transversely of the frame (AF). As shown, the rotary shaft (2) penetrates through both side sections (52R)(52L) of armrest (AF) and the two base brackets (50)(51), while the stopper rod (1) penetrates through the areas of the two base brackets (50) (51) which are disposed outwardly of and adjacent to the rotary shaft (2). Also, in the rotary shaft (2), a pair of first and second connecting end portions (20)(21) are formed, each projecting outwardly from the respective two base brackets (50)(51). Likewise, the stopper rod (1) has a pair of first and second end portions (10)(11) each projecting outwardly from the respective two base brackets (50)(51). In accordance with the present-invention, a circular stopper element (12) is fixed on the first end portion (10) of stopper rod (1) such as to concentric with the central axis of that particular first end portion (10) and extend radially therefrom at a given diameter in parallel with the outward planar surface of first base bracket (50), for a purpose to be set forth later. As shown, preferably, the circular stopper element (12) may be of a disc-like configuration.

As shown in FIGS. 1 and 3, there are provided a pair of spaced-apart first and second frames (60)(61) in the central area of seat back (SB) where the armrest storage recessed area (H) is formed. As can be seen from FIG. 2, the two frames (60)(61) are fixed as by welding to a wire frame (64) disposed at the back side of seat back (SB). Each frame (60 or 61) is of an "L" shape in cross-section, having an outward planar surface oriented forwardly of the seat back (SB), which defines a plane to which a pre-assembled support bracket (3) has been fixed or a separate support bracket (4) is to be firmly fastened. Otherwise stated, the pre-assembled support bracket (3) of a generally L-shaped configuration has been assembled integral with the lower end area of first frame (60), such that the base portion (3B) thereof has been firmly fixed as by welding to the outward surfaces of first frame (60), with the support portion (3A) projecting in a direction forwardly of the seat back (SB). The support portion (3A) of preassembled support bracket (3) is formed therein with a bearing hole (32) and an arcuate guide hole (30), as seen from FIGS. 3 and 4. The arcuate guide hole (30) extends along a circle having a center at the bearing hole (32) and has a circular widened hole region (30M) defined midway therein. Designations (30U) and (30L) denote the uppermost and lowermost ends of the arcuate guide hole (30).

Likewise as in the pre-assembled bracket (3), the separate support bracket (4) is of a generally "L" shape having a support portion (4A) projecting in a length equal to that of the support portion (3A) of pre-assembled support bracket (3), and a base portion (4B). In the support portion (4A), a bearing hole (42) and an arcuate guide hole (40) are formed, as shown, the arrangement thereof being identical to the two holes (32)(30) as described above, except for such circular widened region (30M). The arcuate guide hole (40) has uppermost and lowermost ends (40U)(40L). On the other hand, the base portion (4B) of second support bracket (4) is formed with two securing holes (43)(43) therein, so that it may be firmly fastened via two securing bolts (61B)(61B) to a given lower end area of second frame (61) in which two securing holes (61A)(61A) are formed from receiving the respective two bolts (61B)(61B). Designations (61N)(61N) designate two securing nuts welded integrally on the inward surface of second frame at a point corresponding to that given lower end area.

Figure 4:
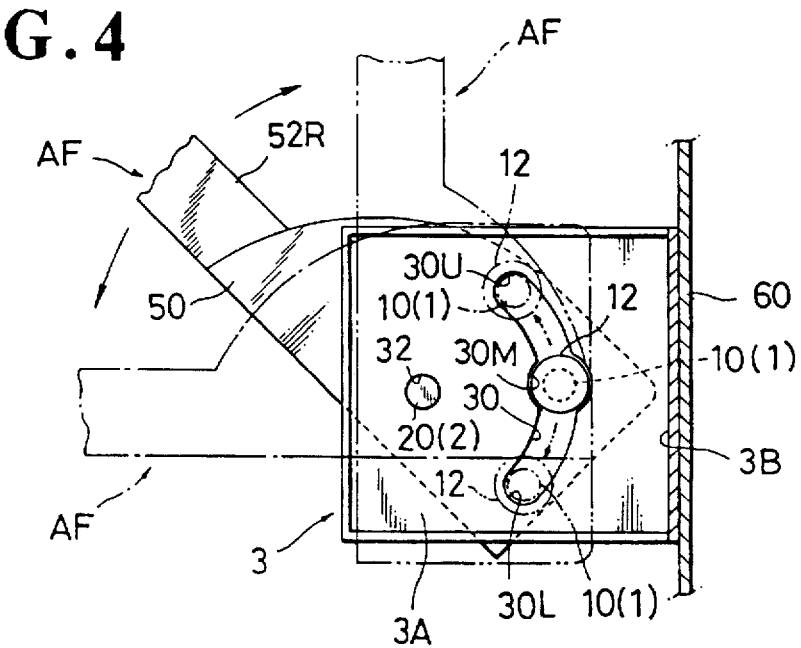
FIG. 4 is a schematic side view of the principal parts of the present invention, showing explanatorily the arrangement of them.

It is noted that both bearing holes (32)(42) respectively of the pre-assembled and separate support brackets (3)(4) are of a same diameter slightly greater than the outer diameters of both first and second end portions (20)(21) of rotary shaft (2), and thus adapted for receiving those two end portions (20)(21), therein, as shown in FIGS. 2, 3 and 4, so that the shaft (2) is rotatable in both holes (32)(43), allowing vertical rotation of the armrest (A) about the axis of shaft (2). Also, both arcuate guide holes (30)(40) respectively of those two support brackets (3)(4) have a same width slightly greater than the outer diameter of both first and second end portions (10)(11) of stopper rod (1), as can be seen in FIGS. 2, 3 and 4, so that the stopper rod (1) is slidably movable along both guide holes (30)(40), within a given range determined by the uppermost and lowermost ends (30U, 40U)(30L,40L) thereof, to thereby limit the upward and downward rotation of armrest (A).

In accordance with the present invention, the circular stopper element (12) has a diameter greater than the width of arcuate guide hole (30) in order to serve as a stopper for preventing the armrest (A) against removal from the bracket (3), as will be explained later.

Further, in particular, the circular widened region (30M) in the first arcuate guide hole (30) is formed in a size that allows the circular stopper element (12) to pass freely therethrough. In other words, such region (30M) may have an inner diameter larger relative to the outer diameter of circular stopper element (12) for that purpose.

According to this armrest arrangement of the present invention, the mounting of the armrest (A) in the seat back (SB) is effected easily in the following steps:

(I) At first, as indicated by the arrow 1 in FIG. 3, the armrest (A) is brought to the pre-assembled support bracket (3). At this point, as shown by the solid line in FIG. 4, the armrest (A) per se is inclined at a generally 45-degree angle relative to the pre-assembled support bracket (3), so that the circular stopper element (12) passes through the circular widened region (30M) of arcuate guide hole (30), while at the same time, the first end portion (20) of rotary shaft (2) is received in the bearing hole (32).

(II) Thereafter, the armrest (A) is rotated about the axis of rotary shaft (2) in either of upward and downward directions, i.e., either towards the upright non-use position indicated by the two-dot chain line in FIG. 4, or towards the horizontal use position indicated by the one-dot chain line in FIG. 4. In that way, the circular stopper element (12) leaves from the circular widened region (30M) and enters the narrowed arcuate region in the arcuate guide hole (30), thereby slidably contacting the coplanar surfaces of pre-assembled support bracket (3) to serve as a stopper for preventing removal of the armrest (A) from the bracket (3). Thus, the armrest (A) is now placed in a locked relation with the pre-assembled support bracket (3), and retained thereto without any need on the worker's part to hold the armrest (A).

(III) Under such state, the separate support bracket (4) is brought to other free side of armrest (A) opposite to the thus-locked side (at 10, 12, 20) of same armrest (A), so that the second end portions (11)(21) respectively of the stopper rod (1) and rotary shaft (2) pass through the respective arcuate guide hole (40) and bearing hole (42), as indicated by the arrow 2 in FIG. 3.

(IV) Then, the separate support bracket (4) is fixed to the second frame (61) by threadedly fastening the two bolts (61B)(61B) in the two nuts (61N)(61N), respectively, as indicated by the arrow 3 in FIG. 3.

Accordingly, the armrest can easily be mounted in the storage area (H) of seat back (SB) with rapidity, as shown in FIGS. 1 and 2, without necessity for fixing both support brackets while holding the armrest therebetween as in the prior art. Namely, with the arrangement described above, (i) the armrest (A) can be inclined at a proper angle (e.g. at 45 degrees), whereby a worker can easily position the armrest (A), in his or her eyes, relative to the pre-assembled support bracket (3) so as to cause insertion of both circular stopper element (12) and rotary shaft end portion (20) through the respective two holes (30M) (32), (ii) the armrest (A) can be simply retained to the support bracket (3) without the need for the worker to directly hold it, and (iii) only one separate support bracket (4) needs to be fixed to the frame (61) for mounting of the armrest (A) on the seat back (SB), which greatly expedites the assemblage of the armrest with a seat back in this sort of movable armrest.

FIG. 3 shows the two frames (60) (61) independently of the seat back (SB), in order to facilitate the understanding of the armrest mounting processes, and actually, the frames (60) (61) has been disposed within the seat back (SB), as shown in FIG. 2. The seat back (SB) is formed by a foam padding layer (63) and a top covering layer (62), and the foregoing storage area (H) is defined by boring the corresponding area of such layers (63) (62) of seat back (SB). Thus, it should be understood that frames (60) (61) in FIG. 3 are provided backwards within the storage area (H) and the two support brackets (3)(4) in FIG. 3 are disposed within the storage area (H) as well. Designations (65) (66) respectively denote a back plate covering the backward opening side of storage area (H) and a board forming a bottom of the storage area (H).

It should be finally understood that the present invention is not limited to the illustrated embodiment, but other modifications, replacements and additions may be structurally applied thereto without departing from the scopes of appended claims. For instance, the circular widened region (30M) may be formed at other desired point in the arcuate guide hole (30), and also both bearing holes (32)(42) may be formed at other desired point in the bracket (3), depending on other variations in design of the armrest (A) and the incidental changes in the relative position between the stopper rod and rotary shaft (2).

What is claimed is:

1. A mounting of an armrest in a seat, including a seat having a seat back, and a armrest rotatable between a non-use position in an armrest storage recessed area formed in the seat back and a use position where the armrest projects from the seat back, said mounting comprising:

a rotary shaft provided in said armrest, said rotary shaft having a first end portion projecting from a first side of said armrest and a second end portion projecting from a second side of said armrest;

a stopper rod provided in said armrest, said stopper rod having a first end portion projecting from said first side of said armrest and a second end portion projecting from said second side of said armrest;

a first support bracket means pre-assembled integrally in said seat back, said first support bracket means including a hole and an arcuate guide hole formed therein;

said arcuate guide hole of said first support bracket means having a widened region defined therein, a stopper means provided fastened on said first end portion of said stopper rod, said stopper means being smaller relative to said widened region in said arcuate guide hole;

wherein said first end portion of said rotary shaft is inserted rotatably through said hole of said first support bracket means, while both said first end portion and stopper means of said stopper rod is inserted, via said widened region, through said arcuate hole of said first support bracket means such as to be slidably fitted therein while being retained against removal from said first support bracket means;

a second support bracket means provided separate from said seat back, said second support bracket means including a hole and an arcuate guide hole formed therein;

and a connecting means for firmly connecting said second support bracket means with said seat back;

wherein said second end portion of said rotary shaft is rotatably inserted through said hole of said second support bracket means, while said second end portion of said stopper rod is slidably inserted through said arcuate guide hole, and wherein said armrest is supported rotatably between said first and second support bracket means, with said second support bracket means being firmly connected with said seat back via said connecting means, in such a manner that said armrest may be displaced between said use position and said non-use position.

2. The mounting as defined in claim 1, wherein said stopper means comprises a circular stopper element fixed on said first end portion of said stopper rod, said circular stopper element having an outer diameter which is smaller relative to said widened region of said arcuate guide hole formed in said first support bracket means and larger relative to a width of said arcuate guide hole associated with said first support bracket means.

3. The mounting as defined in claim 2, wherein said circular stopper element is of a disc-like configuration.

4. The mounting as defined in claim 2, wherein said widened region is defined in a circular fashion in said arcuate guide hole such as to have an inner diameter greater than the outer diameter of said circular stopper element.

5. The mounting as defined in claim 1, wherein said widened region is formed midway in said arcuate guide hole associated with said first support bracket means.

6. The mounting as defined in claim 1, wherein said arcuate guide holes respectively of said first and second support bracket means are each so formed as to extend along a circle having a center at each of said holes respectively of said first support bracket means and said second support bracket means, and wherein, in said first support bracket means, said widened region is formed midway in the thus-formed arcuate guide hole.

7. The mounting as defined in claim 1, wherein said connecting means comprises: a securing bolt means; a securing hole means defined in said second support bracket means; and a securing nut means provided in said seat back, and wherein said securing bolt means is inserted through said securing hole means and threadedly fastened in said securing nut means so as to firmly connect said second support bracket means with said seat back.

8. The mounting as defined in claim 1, wherein said rotary shaft, stopper rod and stopper means are disposed at a point rearwardly of said armrest such that a body of said armrest extends from said point in a direction forwardly thereof, wherein said arcuate guide holes respectively of said first support bracket means and said second support bracket means are each so formed as to extend along a circle having a center at each of said holes respectively of said first support bracket means and said second support bracket means, and wherein, in said first support bracket means, said widened region is formed at a predetermined point in said arcuate guide hole, so that, in assemblage, said armrest may be mounted in an inclined state to said seat back when said first end portion of said rotary shaft and stopper rod are inserted through the respective said hole and widened region of the arcuate guide hole which are associated with said first support bracket means, and further, said armrest may be retained by said stopper means to said first support bracket means against removal therefrom when rotating said armrest about said rotary shaft to cause said stopper rod to slidingly move in said arcuate guide hole from said widened region, in advance before inserting said second end portion of said rotary shaft and stopper rod through the respective said hole and arcuate guide hole of said second support bracket means.

* * * * *